United States Patent [19]

Hayashi et al.

[11] Patent Number: 5,796,224
[45] Date of Patent: Aug. 18, 1998

[54] CONTROL SYSTEM FOR ELECTRIC VEHICLE

[75] Inventors: Kiyotaka Hayashi; Hisahiro Ito; Tomoyuki Itoh; Naofumi Hoshi, all of Saitama, Japan

[73] Assignee: Honda Giken Kogyo Kabushiki Kaisha, Tokyo, Japan

[21] Appl. No.: 639,407

[22] Filed: Apr. 29, 1996

[30] Foreign Application Priority Data

Apr. 28, 1995 [JP] Japan .................. 7-105434

[51] Int. Cl.$^6$ ............................................ H02P 1/00
[52] U.S. Cl. ................ 318/139; 318/803; 318/152; 318/148; 320/27; 320/61
[58] Field of Search ................ 318/52, 151, 71, 318/139, 802, 807, 801, 299, 148, 803, 152, 805, 459, 721, 723, 722, 376; 363/20, 15, 16, 123; 320/27, 61, 64, 65

[56] References Cited

U.S. PATENT DOCUMENTS 3,845,372 10/1974 Ringland et al. .................. 318/721
4,335,337 6/1982 Okamatsu et al. .................. 318/52
5,440,219 8/1995 Wilkerson .................. 318/802
5,455,491 10/1995 Hajogos et al. .................. 323/320
5,583,751 12/1996 Nakazawa et al. .................. 363/20

FOREIGN PATENT DOCUMENTS 638550 2/1994 Japan.
638575 2/1994 Japan.
6225402 8/1994 Japan.

Primary Examiner—John W. Cabeca
Attorney, Agent, or Firm—Lyon & Lyon LLP

[57] ABSTRACT

An electronic control unit for controlling an inverter mounted between a main battery and a motor in an electric vehicle includes a feed-back control device which ensures that an actual electric power calculated from an electric current and a voltage inputted to the inverter is equalized to a target electric power calculated from the motor revolution-number, an accelerator opening degree and a shift position. If a circuit between the main battery and the motor is opened during regenerative operation, so that the charging of the main battery with a regenerative electric power cannot be performed and as a result, the voltage is increased to exceed a predetermined value, a regeneration prohibiting device prohibits the regenerative operation of the motor to prevent damage to the inverter due to a counter-electromotive voltage of the motor.

5 Claims, 9 Drawing Sheets 5,796,224

1

CONTROL SYSTEM FOR ELECTRIC VEHICLE

BACKGROUND OF THE INVENTION

1. Field of the Invention

The present invention relates to a control system for an electric vehicle, including an inverter which converts a DC electric current of a battery into an AC electric power to supply it to a motor during driving of the motor, and which converts an AC electric power generated by the motor into a DC electric power to supply it to the battery during regeneration operation of the motor.

2. Description of the Related Art

Such control systems for electric vehicles are already known from Japanese Patent Application Laid-open Nos. 38575/94, 38550/94 and 225402/94.

In the control system described in Japanese Patent Application Laid-open No. 38575/94, a target electric power is calculated based on the number of revolutions of the motor and a torque command value, and a feed-back control of the motor electric power is carried out through the inverter, so that an actual electric power becomes equal to the target electric power. In this control system, if the contactor of the motor is opened for some reason or other and hence, the regenerated power of the motor is not recovered to the battery, there is a possibility that the field weakening quantity is increased by the feed-back control of the motor power to increase the counter-electromotive voltage of the motor, thereby adversely affecting the inverter.

In the control system described in Japanese Patent Application Laid-open No. 38550/94, in converting an AC power generated by the motor into a DC current by a boosting chopper in the inverter during regeneration operation of the motor, the boosting chopper is controlled so that the regenerative voltage does not exceed the battery voltage. This control system has a problem that the control of the regenerative voltage cannot be performed in a high revolution range of the motor in which the regenerative voltage exceeds the battery voltage.

In the control system described in Japanese Patent Application Laid-open No. 225402/94, in a non-neutral shift position, a PWM control is carried out in a range of a low number of revolutions of the motor, and a field weakening control is carried out in a range of a high number of revolutions of the motor. When the shift position is neutral, the inverter is turned OFF in the range of a low number of revolutions of the motor to cut off the supplying of electric power to the motor, and a target value for an output torque from the motor is set at 0 in the range of a high number of revolutions of the motor. This control system is intended to prevent the generation of a higher counter-electromotive voltage to avoid the breaking of a circuit, but suffers from a problem that the circuit cannot be protected in shift positions other than the neutral shift position.

SUMMARY OF THE INVENTION

Accordingly, it is an object of the present invention to prevent the inverter from being damaged by a counter-electromotive voltage of the motor when a circuit between the battery and the inverter is opened for any reason during feed-back control of the motor power.

To achieve the above object, according to the present invention, there is provided a control system for an electric vehicle, comprising: an inverter which is disposed between a battery and a motor and which converts a DC electric power of the battery into an AC electric power to supply it to the motor during driving of the motor, and converts an AC electric power generated by the motor into a DC electric power to supply it to the battery during regenerative operation of the motor; an electric current sensor for detecting an electric current in a DC section of the inverter; a voltage sensor for detecting a voltage in the DC section of the inverter; an actual electric power calculating means for calculating an actual electric power to be inputted to the inverter, based on an electric current detected by the electric current sensor and a voltage detected by the voltage sensor; a target electric power calculating means for calculating a target electric power to be inputted to the inverter, based on at least an accelerator opening degree; and a feed-back control means for controlling the operational state of the motor through the inverter to make the actual electric power calculated by the actual electric power calculating means coincide with the target electric power calculated by the target electric power calculating means; wherein the control system further includes a regeneration prohibiting means for prohibiting the regenerative operation of the motor, the regeneration prohibiting means being operated when the voltage in the DC section of the inverter exceeds a predetermined value, and the operation of the regeneration prohibiting means being stopped when the electric current in the DC section of the inverter exceeds a predetermined value during operation of the regeneration prohibiting means.

With the above arrangement, when the voltage in the DC section of the inverter exceeds a predetermined value, the regeneration prohibiting means is operated to prohibit the regenerative operation of the motor. Therefore, it is possible to decrease the counter-electromotive voltage generated by the motor to avoid damage to the inverter. When the electric current in the DC section of the inverter exceeds the predetermined value during operation of the regeneration prohibiting means, the operation of the regeneration prohibiting means is stopped. Therefore, when a possibility of damaging of the inverter is eliminated by repairing of a failure, the control system can be immediately restored to a usual feed-back control.

In addition, according to the present invention, there is provided a control system for an electric vehicle, comprising: an inverter which is disposed between a battery and a motor and which converts a DC electric power of the battery into an AC electric power to supply it to the motor during driving of the motor, and converts an AC electric power generated by the motor into a DC electric power to supply it to the battery during regenerative operation of the motor; an electric current sensor for detecting an electric current in a DC section of the inverter; a voltage sensor for detecting a voltage in the DC section of the inverter; an actual electric power calculating means for calculating an actual electric power to be inputted to the inverter, based on an electric current detected by the electric current sensor and a voltage detected by the voltage sensor; a target electric power calculating means for calculating a target electric power to be inputted to the inverter, based on at least an accelerator opening degree; and a feed-back control means for controlling the operational state of the motor through the inverter to make the actual electric power calculated by the actual electric power calculating means coincide with the target electric power calculated by the target electric power calculating means; wherein the control system further includes a regeneration prohibiting means for prohibiting the regenerative operation of the motor, the regeneration prohibiting means being operated when the voltage in the DC section of the inverter exceeds a predetermined value, and the operation of the regeneration prohibiting means being stopped when the voltage in the DC section of the inverter, after being decreased, is increased to exceed a second predetermined value during operation of the regeneration prohibiting means.

With the above arrangement, when the voltage in the DC section of the inverter exceeds a predetermined value, the regeneration prohibiting means is operated to prohibit the regenerative operation of the motor. Therefore, it is possible to decrease the counter-electromotive voltage generated by the motor to avoid damage to the inverter. When the voltage in the DC section of the inverter, after being decreased, is increased to exceed the second predetermined value during operation of the regeneration prohibiting means, the operation of the regeneration prohibiting means is stopped. Therefore, when a possibility of damaging of the inverter is eliminated by repairing of a failure, the control system can immediately be restored to a usual feed-back control.

In addition to the above arrangement, the regeneration prohibiting means prohibits the regenerative operation of the motor by converting the target electric power calculated by the target electric power calculating means from a negative value into a positive value. Thus, the arrangement of the regeneration prohibiting means is simplified, and it is unnecessary to add a substantial modification in design to a control section.

The above and other objects, features and advantages of the invention will become apparent from the following detailed description of the preferred embodiments taken in conjunction with the accompanying drawings.

BRIEF DESCRIPTION OF THE DRAWINGS

FIGS. 1 to 7 show a first embodiment of the present invention, wherein:

FIG. 1 is a diagrammatic illustration of the entire arrangement of an electric vehicle including a control system according to a first embodiment of the present invention;

FIG. 2 is a block diagram of a control system;

FIG. 3 shows wave forms of a switching signal from an inverter;

FIG. 4 is a block diagram of a circuit arrangement of an electronic control unit;

FIG. 5 is a first portion of a main routine;

FIG. 6 is a second portion of the main routine; and

FIG. 7 is a flowchart of a flag setting routine.

FIGS. 8 and 9 show a second embodiment of the invention, wherein:

FIG. 8 is a flowchart of a flag setting routine in a second embodiment of the present invention; and FIG. 9 is a time chart for setting of a flag.

DETAILED DESCRIPTION OF THE PREFERRED EMBODIMENTS

Figure 1:
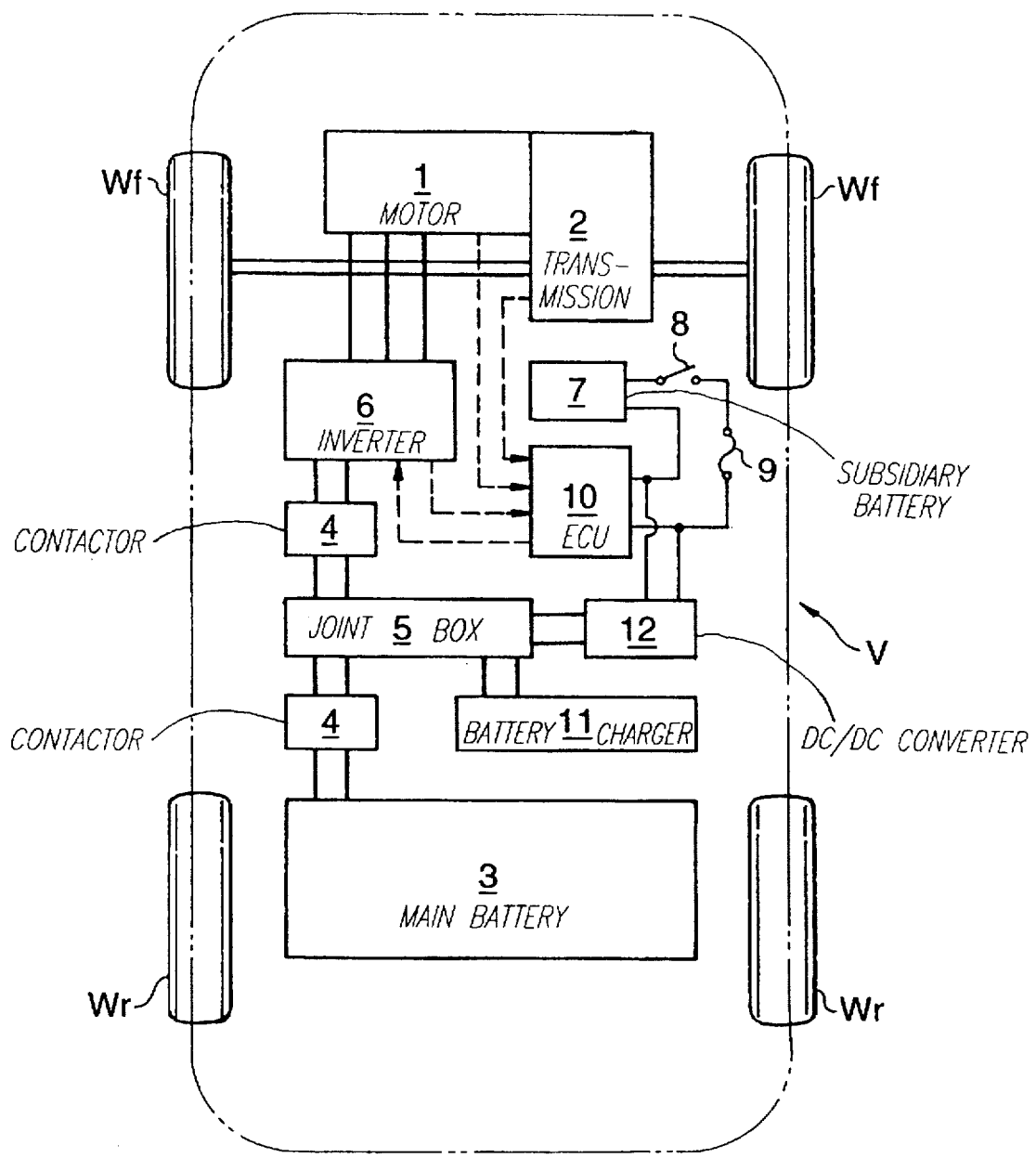
Figure 2:
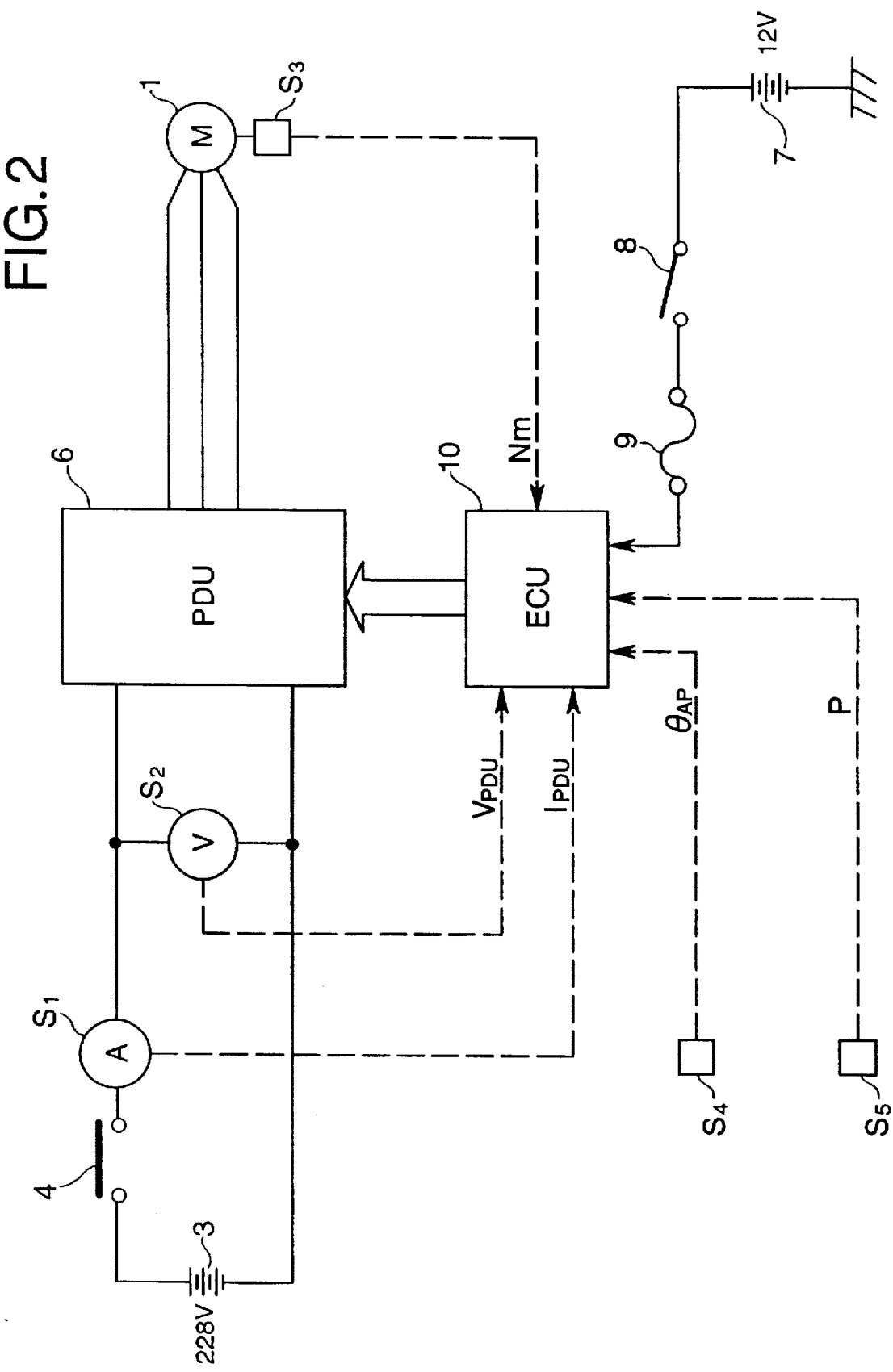

Referring to FIGS. 1 and 2, a four-wheel electric vehicle V includes a pair of left and right front wheels Wf, Wf as driven wheels to which a torque of a three-phase AC motor 1 is transmitted through a transmission 2, and a pair of left and right rear wheels Wr, Wr as follower wheels. A main battery 3, for example, of 228 volts, is mounted at a rear portion of the electric vehicle V and connected to the motor 1 through a contactor 4, a joint box 5, another contactor 4, and an inverter 6 constituting a power drive unit. An electronic control unit 10 is connected to a subsidiary battery 7, for example, of 12 volts, through a main switch 8 and a fuse 9 and is also connected to the inverter 6 to control the driving torque and the regenerative torque of the motor 1. A battery charger 11 and a DC/DC converter 12 are mounted to charge the subsidiary battery 7 with an electric power of the main battery 3.

In a high-voltage circuit connecting the main battery 3 and the inverter 6, i.e., in a DC section of the inverter 6, there are an electric current sensor $S_1$ for detecting an electric current $I_{PDU}$ in the DC section, and a voltage sensor $S_2$ for detecting a voltage $V_{PDU}$ in the DC section. The electric current $I_{PDU}$ in the DC section of the inverter 6 detected by the electric current sensor $S_1$ and the voltage $V_{PDU}$ in the DC section of the inverter 6 detected by the voltage sensor $S_2$ are inputted to the electronic control unit 10. A motor revolution-number Nm detected by a motor revolution-number sensor $S_3$, an accelerator opening degree $\theta_{AP}$ detected by an accelerator opening degree sensor $S_4$ and a shift position P detected by a shift position sensor $S_5$ are also inputted to the electronic control unit 10.

The inverter 6 includes a plurality of switching elements. By inputting a switching signal from the electronic control unit 10 to each of the switching elements, during driving of the motor 1, the DC electric current of the main battery 3 is converted into a three-phase AC electric power and supplied to the motor 1, and when the motor 1 is driven by the wheels (during regeneration), a three-phase AC electric power generated by the motor 1 is converted into a DC electric power and supplied to the main battery 3.

In a range of a low number of revolutions of the motor 1, the inverter 6 is subjected to a PWM (pulse width modulation) control, and in a range of a high number of revolutions of the motor 1 after the duty factor of the PWM control has reached 100%, the inverter 6 is subjected to a so-called field weakening control. The field weakening control is for applying field electric current components to a primary electric current to be supplied to the motor 1, so that a field is generated in an opposite direction from a field generated by a permanent magnet of the motor 1, so as to reduce the entire field to increase the number of revolutions of the motor 1 into a larger value.

Figure 3:
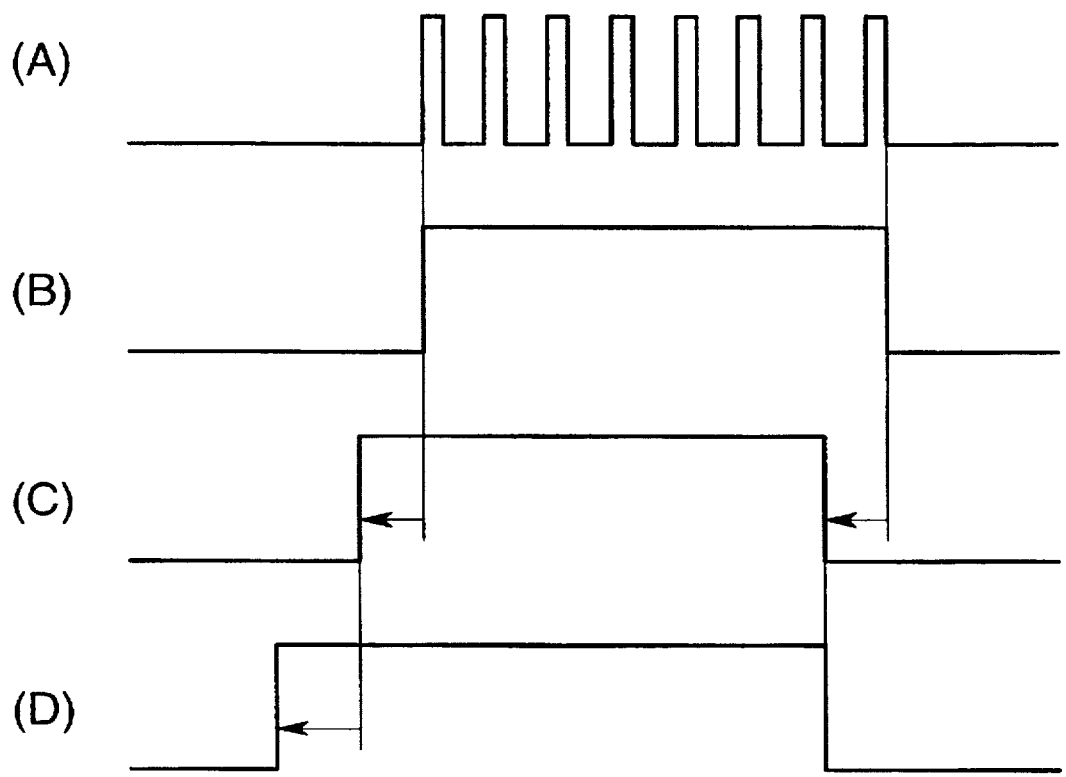

FIG. 3 shows wave forms of the switching signal inputted to each of the switching elements, (A) indicating a condition in which the duty factor of the PWM control is less than 100%; (B) indicating a condition in which the duty factor of the PWM control has reached 100%; (C) indicating a condition in which the energization phase has been advanced by the field weakening control; and (D) indicating a condition in which the energization phase has been extended by the field weakening control. With an increase in the number of revolutions of the motor 1, the controls of (A), (B), (C) and (D) are carried out sequentially.

Figure 4:
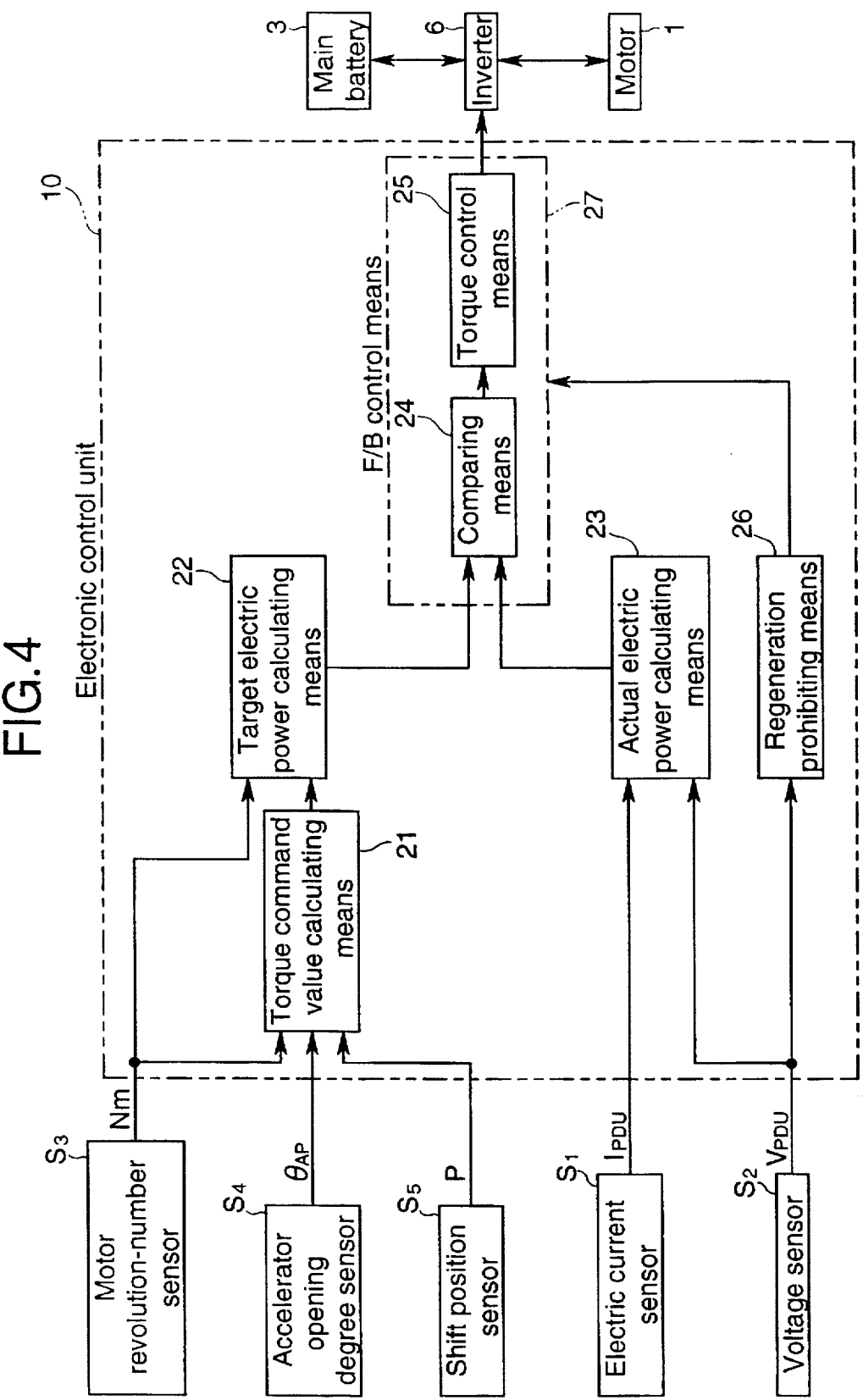

The circuit arrangement and the operation of the electronic control unit 10 will be described below with reference to FIG. 4.

The electronic control unit 10 includes a torque command value calculating means 21, a target electric power calculating means 22, an actual electric power calculating means 23, a comparing means 24, a torque control means 25 and a regeneration prohibiting means 26. The comparing means 24 and the torque control means 25 constitute a feed-back control means 27.

The torque command value calculating means 21 calculates a torque command value for a torque which is to be generated in the motor 1 by a driver, for example, by a map searching, based on the motor revolution-number Nm detected by the motor revolution-number sensor $S_3$, the accelerator opening degree $\theta^{AP}$ detected by the accelerator opening degree sensor $S_4$ and the shift position P detected by the shift position sensor $S_5$. The target electric power calculating means 22 calculates a target electric power which is to be supplied to the motor 1, or to be taken from the motor 1 by the regenerative operation, by multiplying the torque command value calculated by the torque command value calculating means 21 and the motor revolution-number Nm detected by the motor revolution-number sensor $S_3$ and dividing the resulting value by a converting efficiency. The target electric power is of a positive value in one case and of a negative value in the other case. The positive target electric power corresponds to the case where the motor 1 generates the driving torque, and the negative target electric power corresponds to the case where the motor 1 generates the regenerative torque.

The actual electric power calculating means 23 calculates an actual electric power which is to be inputted to the inverter 6, by multiplying the electric current $I_{PDU}$ in the DC section of the inverter 6 detected by the electric current sensor $S_1$ and the voltage $V_{PDU}$ in the DC section of the inverter 6 detected by the voltage sensor $S_2$. As is the target electric power, the actual electric power is of a positive value in one case and of a negative value in the other case. The positive actual electric power corresponds to the case where the motor 1 generates the driving torque, and the negative target electric power corresponds to the case where the motor 1 generates the regenerative torque.

The target electric power calculated by the target electric power calculating means 22 and the actual electric power calculated by the actual electric power calculating means 23 are inputted to the comparing means 24 of the feed-back control means 27, where a deviation between the target and actual electric powers is calculated. The torque control means 25 performs the feed-back control of the inverter 6 by the PWM control or by the field weakening control, based on the deviation calculated in the feed-back control means 27. As a result, the operational state of the motor 1 is changed to ensure that the actual electric power is equalized to the target electric power. When the target electric power is of a negative value, i.e., when the motor 1 functions as a generator to charge the main battery 3, if the contactor 4 provided in the high-voltage circuit is opened, or the high-voltage circuit is wire-broken for some reason or other, electric current does not flow through the high-voltage circuit, so that the electric current $I_{PDU}$ detected by the electric current sensor $S_1$ becomes 0 (zero), and the actual electric power, which is a product of the electric current $I_{PDU}$ and the voltage $V_{PDU}$, also becomes 0 (zero). At that time, the motor 1 is in regenerative operation and the target electric power is negative. For this reason, the field weakening control decreases the field weakening quantity by the feed-back control based on the deviation between the target electric power (of the negative value) and the actual electric power (0), thereby increasing the counter-electromotive voltage generated by the motor 1. As a result, there is a possibility that the inverter 6 and other devices on the high-voltage circuit may be adversely affected by a high counter-electromotive voltage generated by the motor 1.

Therefore, when the voltage $V_{PDU}$ detected by the voltage sensor $S_2$ has exceeded a predetermined value, the regeneration prohibiting means 26 outputs a regeneration prohibiting command to the feed-back control means 27 to prevent the generation of the high counter-electromotive voltage. More specifically, when the voltage $V_{PDU}$ has exceeded the predetermined value, the sign of the target electric power calculated by the target electric power calculating means 22 is inverted from one of positive and negative to the other. This causes the target electric power assuming a negative value to be forcedly converted into a positive value. By the feed-back control based on a deviation between the target electric power (of the positive value) resulting from the conversion and the actual value (0), the field weakening control acts to increase the field weakening quantity to decrease the counter-electromotive voltage generated by the motor 1, thereby avoiding the damages to the inverter 6 and the other devices.

The above-described operation will be further described below with reference to flowcharts in FIGS. 5 to 7.

Figure 5:
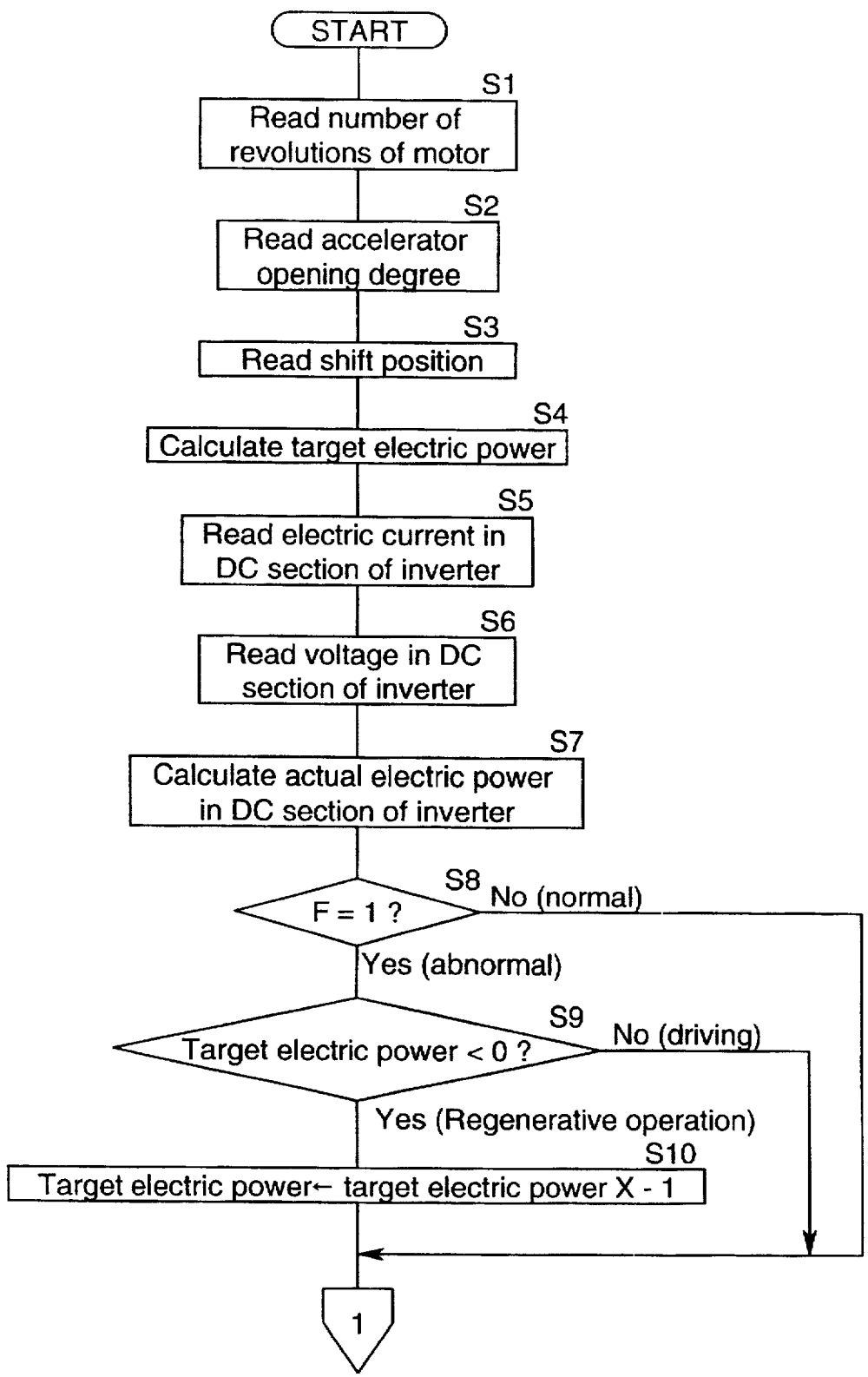
Figure 6:
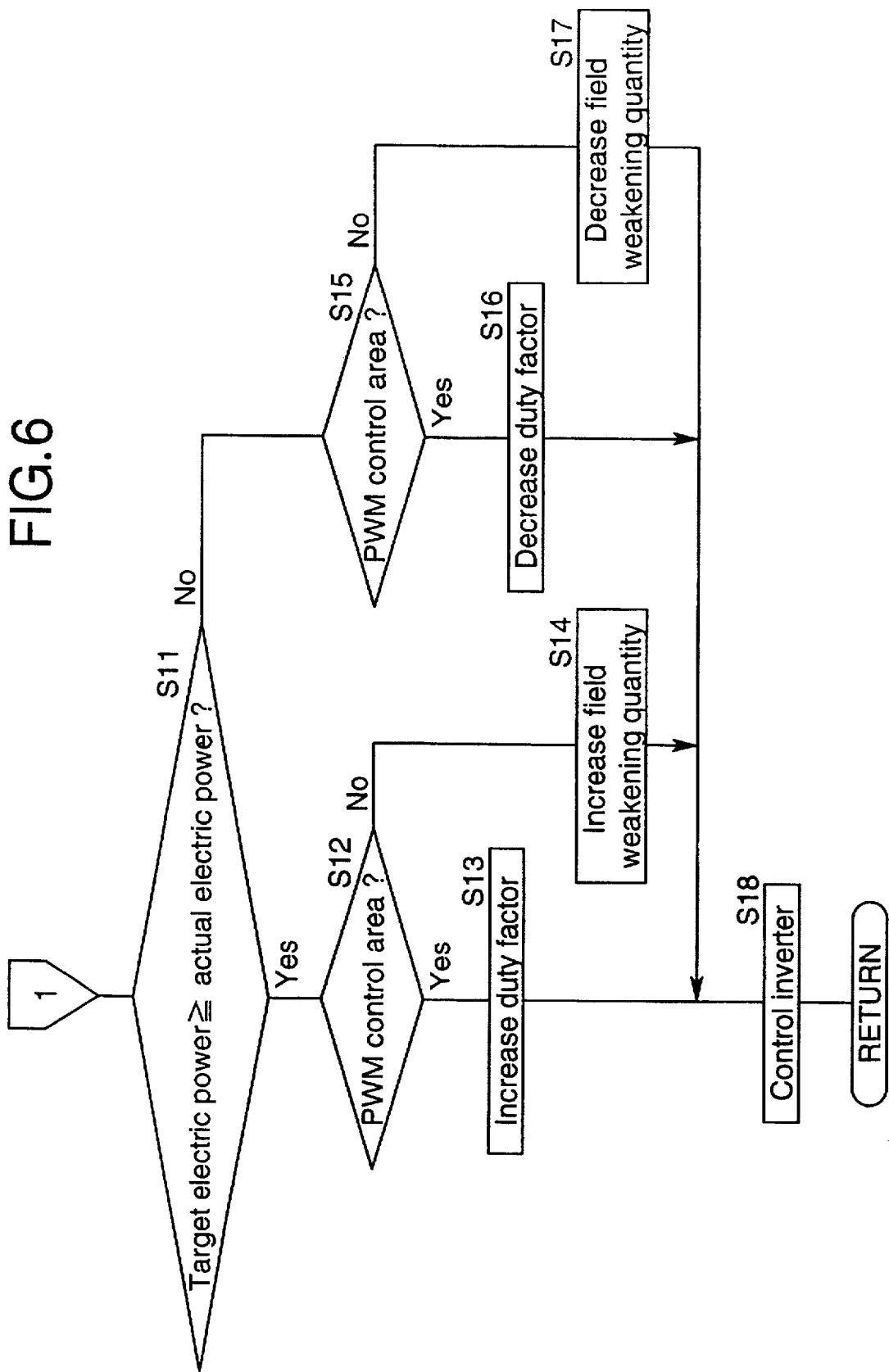

At steps S1 to S3 in a main routine in FIGS. 5 and 6, the motor revolution-number Nm, the accelerator opening degree $\theta_{AP}$ and the shift position P are read from the motor revolution-number sensor $S_3$, the accelerator opening degree sensor $S_4$ and the shift position sensor $S_5$. At subsequent step S4, a target electric power is calculated based on the motor revolution-number Nm, the accelerator opening degree $\theta_{AP}$ and the shift position P. At steps S5 and S6, an electric current $I_{PDU}$ and a voltage $V_{PDU}$ in the DC section of the inverter 6 are read from the electric current sensor $S_1$ and the voltage sensor $S_2$. And at subsequent step S7, an actual electric power is calculated based on the electric current IPDU and the voltage $V_{PDU}$.

Then, at step S8, it is determined whether a high voltage inhibiting flag F has been set at 1. If the high voltage inhibiting flag F has not been set at 1 (F=0), the voltage $V_{PDU}$ in the DC section of the inverter 6 is equal to or lower than the predetermined value. If the high voltage inhibiting flag F has been set at 1 (F=1), the voltage $V_{PDU}$ in the DC section of the inverter 6 exceeds the predetermined value.

Figure 7:
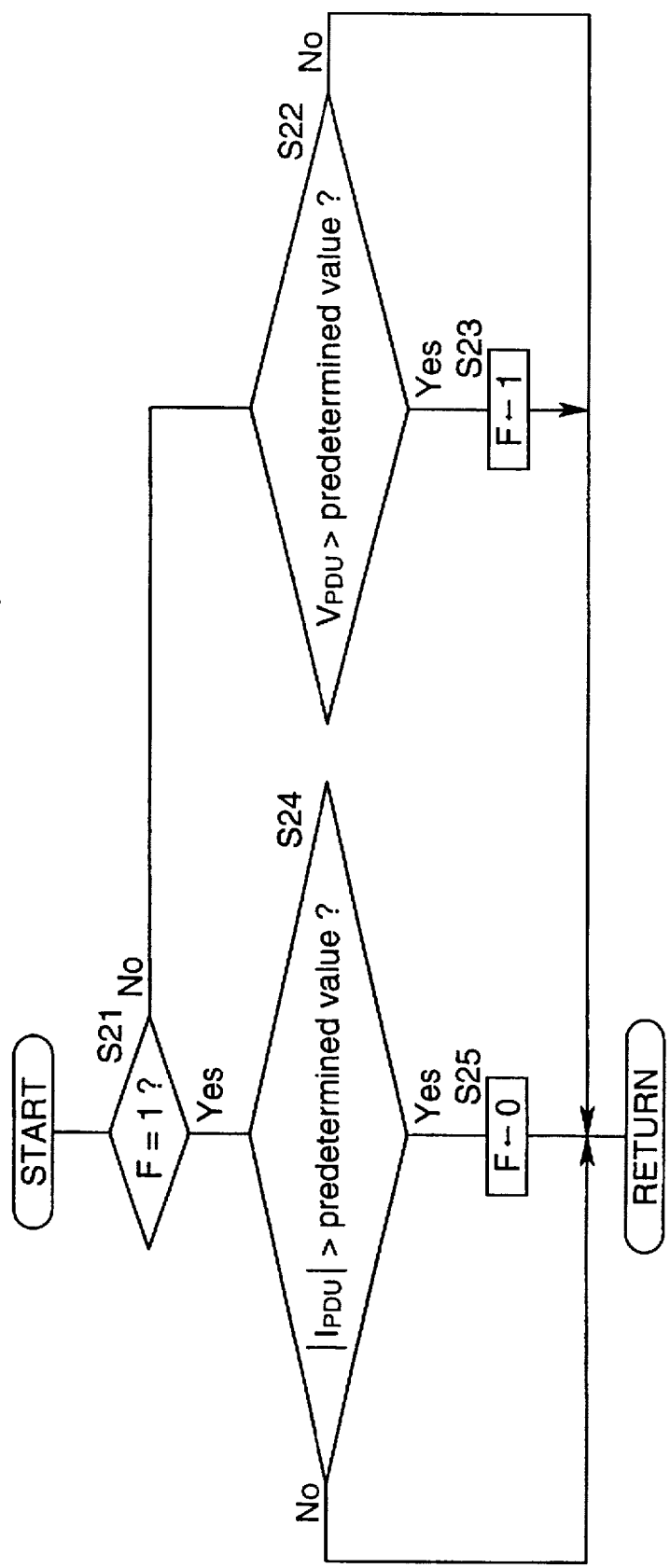

Specifically, as shown in a flag setting routine in FIG. 7, the answer at step S21 is initially NO, because an initial value of the high voltage inhibiting flag F is 0 (zero). If the voltage $V_{PDU}$ becomes higher than the predetermined value at step S22, for example, for a reason that the contactor 4 has failed into an opened state, the high voltage inhibiting flag F is set from 0 to 1 at step S23. If the answer at step S21 is YES to indicate that the high voltage inhibiting flag F has been set at 1, the failure of the contactor 4 is repaired, for example, at step S24, so that the contactor 4 is closed. If the absolute value $|I_{PDU}|$ of the electric current $I_{PDU}$ which has been 0 theretofore exceeds the predetermined value, the high voltage inhibiting flag F is reset from 1 to 0 at step S25. Unless the motor is stopped, an electric current $I_{PDU}$ may be generated even though regeneration has been prohibited in step S21 either (1) when the motor is in the driving mode by the driving current or (2) when the motor is in a regenerative mode if the contactor 4 is closed by reason of a failure because the electric current will flow for a moment from the battery 3 to the PDU (inverter) 6.

Returning to the main routine, in a normal condition in which the answer at step S8 is NO to indicate that the high voltage inhibiting flag F has not been set at 1, the processing is passed to step S11, where a usual control is carried out.

More specifically, when the target electric power is equal to or higher than the actual electric current at step S11, if the control area is the PWM control area at step S12, the command value for the duty factor is increased at step S13. If the control area is not the PWM control area at step S12, the command value for the field weakening quantity is increased at step S14. On the other hand, when the target electric power is lower than the actual electric power at step S11, if the control area is the PWM control area, the command value for the duty factor is decreased at step S16.

If the control area is not the PWM control area, the command value for the field weakening quantity is decreased.

At step S18, the inverter 6 is subjected to the feed-back control to converge the actual electric power into the target electric power, based on the command value for the duty factor and the command value for the field weakening quantity which have been determined at steps S13, S14, S16 and S17.

When the high voltage inhibiting flag F has been set at 1 at step S8 and the target electric power is a negative value at step S9, i.e., when the voltage $V_{PDU}$ has exceeded the predetermined value during the regenerative operation of the motor 1, the sign of the target electric power is inverted at step S10, so that the target electric power which has been a negative value theretofore is forcedly converted into a positive value, in order to prevent damages to the inverter 6 and the other devices.

At that time, the contactor 4 is in an opened state and the actual electric power is equal to 0 and hence, the answer at step S11 becomes YES, proceeding to step S12. As a result, if the control area is out of the PWM control area at step S12, the command value for the field weakening quantity is increased at step S14. Therefore, the counter-electromotive voltage of the motor 1 is dropped to prevent damages to the inverter 6 and the other devices. In this manner, it is possible to simply and reliably drop the counter-electromotive voltage of the motor 1 only by inverting the sign of the target electric power without a substantial change in design of the feed-back system, when the voltage $V_{PDU}$ exceeds the predetermined value during regenerative operation of the motor 1.

A second embodiment of the present invention will now be described with reference to FIGS. 8 and 9.

Figure 8:
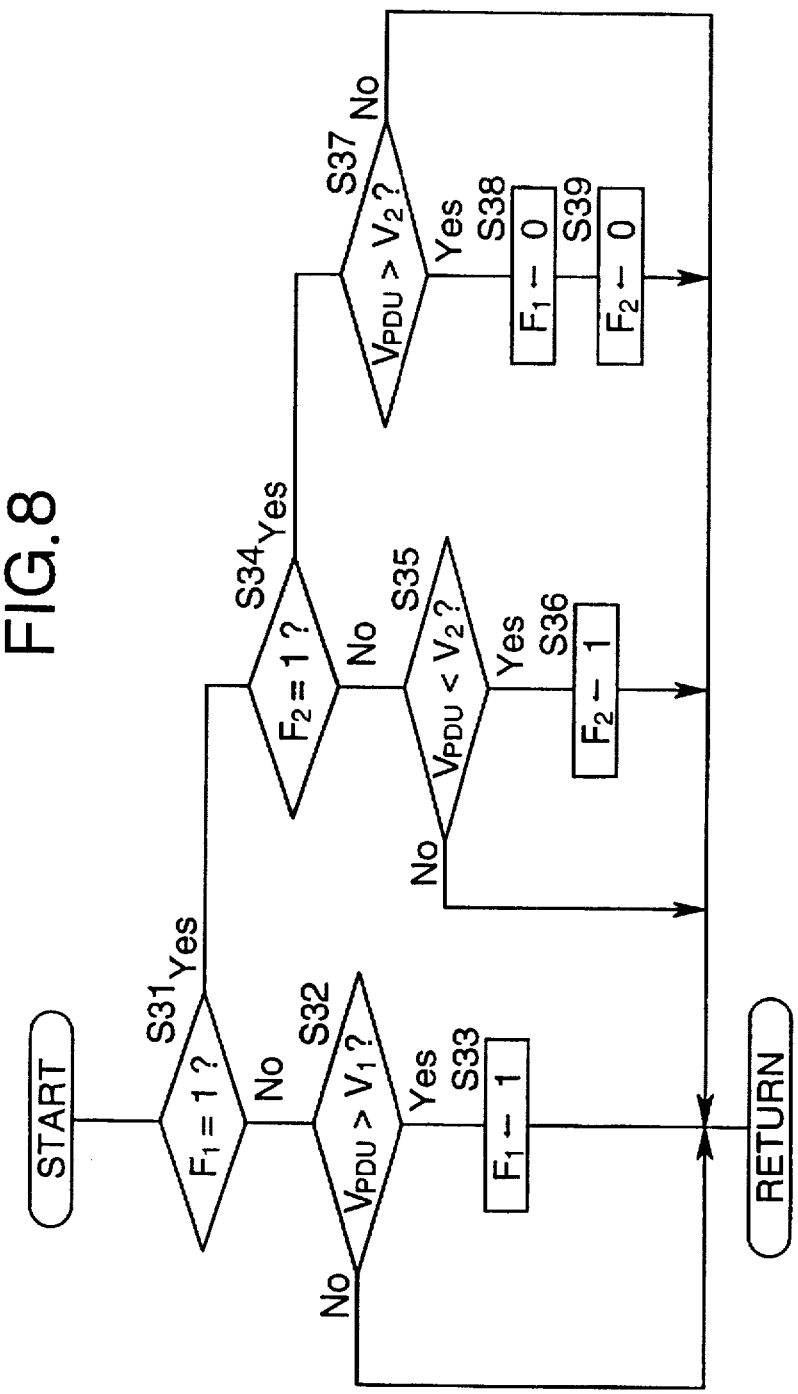
Figure 9:
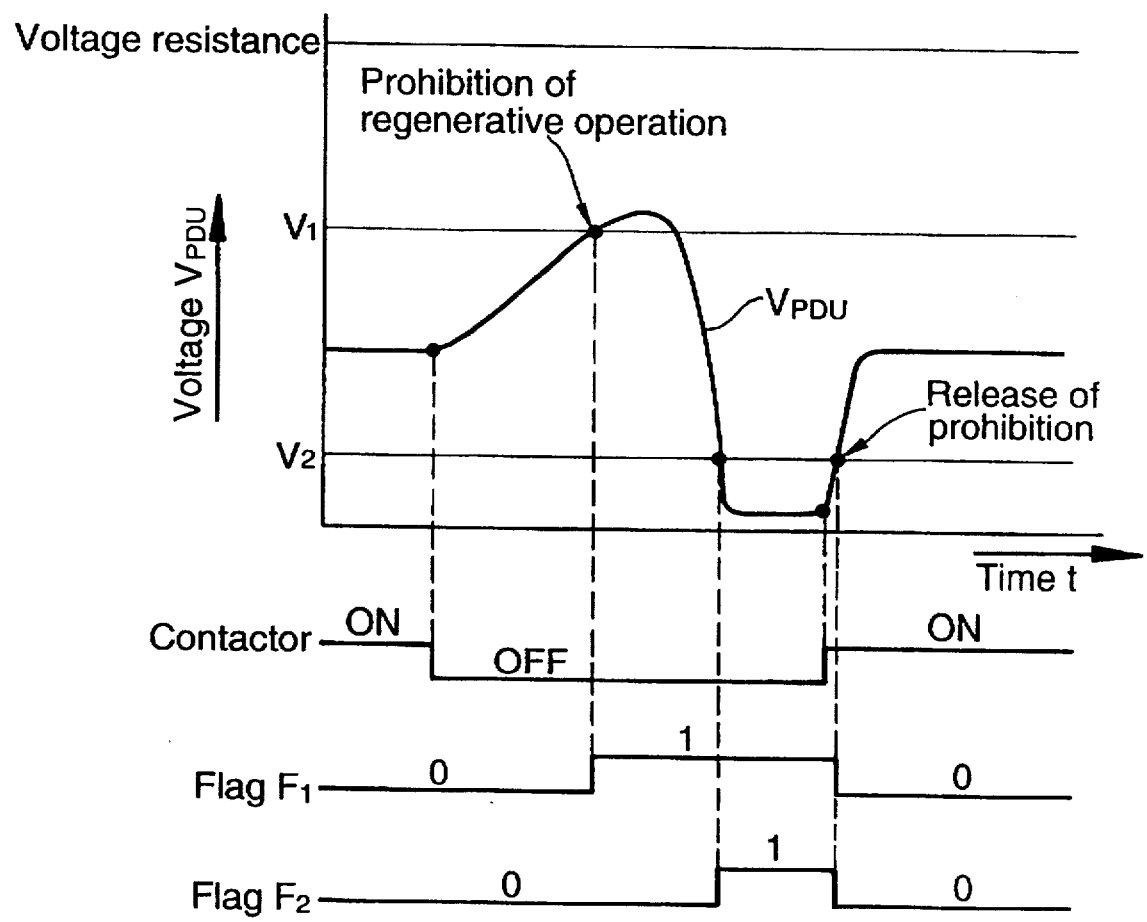

In the second embodiment, the flowcharts in FIGS. 5 and 6 used in the first embodiment are also used in the same manner, but in place of the flowchart in FIG. 7; a flowchart in FIG. 8 is used in the second embodiment. The second embodiment is different from the above-described first embodiment only in a method for setting and resetting the high voltage inhibiting flag F which governs the prohibition of the regenerative operation and the release of the prohibition in step S8 of the flowchart in FIG. 5. Here, reference character $F_1$ is a high voltage inhibiting flag which corresponds to the high voltage inhibiting flag F in the first embodiment, and reference character $F_2$ is an auxiliary flag which is newly incorporated. Both of the initial values of the high voltage inhibiting flag $F_1$ and the auxiliary flag $F_2$ are set at 0 (zero).

First, the answer at step S31 is initially NO, because the initial value of the high voltage inhibiting flag $F_1$ is 0. If the voltage $V_{PDU}$ exceeds a predetermined value $V_1$, for example, for a reason that the contactor 4 has failed into an opened state, the high voltage inhibiting flag $F_1$ is set at 1 from 0 at step S33. When the answer at step S31 is YES to indicate that the high voltage inhibiting flag $F_1$ has been set at 1, the answer at step S34 is initially NO, proceeding to step S35, because the initial value of the auxiliary flag $F_2$ is 0.

The voltage $V_{PDU}$ is decreased by the prohibition of the regenerative operation started by the setting of the high voltage inhibiting flag $F_1$ at 1. If the voltage $V_{PDU}$ becomes lower than a predetermined value $V_2$ at step S35, the auxiliary flag $F_2$ is set at 1 from 0 at step S36. Thereafter, the voltage $V_{PDU}$ is increased, for example, by closing of the contactor 4 as a result of the repairing of the failure. If the voltage $V_{PDU}$ exceeds the predetermined value $V_2$ at step S37, the high voltage inhibiting flag $F_1$ is reset from 1 to 0 at step S37 to release the prohibition of the regenerative operation, and the auxiliary flag $F_2$ is reset from 1 to 0 at step S39.

In this manner, when the voltage $V_{PDU}$ once becomes lower than the predetermined value $V_2$ after prohibition of the regenerative operation and thereafter, becomes higher than the predetermined value $V_2$, it is determined that the failure has been repaired, thereby releasing the prohibition of the regenerative operation.

Although the embodiments of the present invention have been described in detail, it will be understood that the present invention is not limited to the above-described embodiments, and various modifications in design may be made without departing from the spirit and scope of the invention defined in claims.

We claim:

1. A control system for an electric vehicle, comprising:

an inverter which is disposed between a battery and a motor and which converts a DC electric power of said battery into an AC electric power to supply it to said motor during driving of said motor, and converts an AC electric power generated by said motor into a DC electric power to supply it to said battery during regenerative operation of said motor;

an electric current sensor for detecting an electric current in a DC section of said inverter;

a voltage sensor for detecting a voltage in the DC section of said inverter;

an actual electric power calculating means for calculating an actual electric power to be inputted to said inverter, based on an electric current detected by said electric current sensor and a voltage detected by said voltage sensor;

a target electric power calculating means for calculating a target electric power to be inputted to said inverter, based on at least an accelerator opening degree;

and a feed-back control means for controlling the operational state of said motor through said inverter to make the actual electric power calculated by said actual electric power calculating means coincide with the target electric power calculated by said target electric power calculating means; wherein said control system further includes a regeneration prohibiting means for prohibiting the regenerative operation of said motor for protecting said inverter, said regeneration prohibiting means being operated when the voltage in the DC section of said inverter exceeds a predetermined value, and the operation of said regeneration prohibiting means being stopped when the electric current in the DC section of said inverter exceeds a predetermined value during operation of said regeneration prohibiting means.

2. A control system for an electric vehicle, comprising:

an inverter which is disposed between a battery and a motor and which converts a DC electric power of said battery into an AC electric power to supply it to said motor during driving of said motor, and converts an AC electric power generated by said motor into a DC electric power to supply it to said battery during regenerative operation of said motor;

an electric current sensor for detecting an electric current in a DC section of said inverter;

a voltage sensor for detecting a voltage in the DC section of said inverter;

an actual electric power calculating means for calculating an actual electric power to be inputted to said inverter, based on an electric current detected by said electric current sensor and a voltage detected by said voltage sensor;

a target electric power calculating means for calculating a target electric power to be inputted to said inverter, based on at least an accelerator opening degree;

and a feed-back control means for controlling the operational state of said motor through said inverter to make the actual electric power calculated by said actual electric power calculating means coincide with the target electric power calculated by said target electric power calculating means; wherein said control system further includes a regeneration prohibiting means for prohibiting the regenerative operation of said motor for protecting said inverter, said regeneration prohibiting means being operated when the voltage in the DC section of said inverter exceeds a predetermined value, and the operation of said regeneration prohibiting means being stopped when the voltage in the DC section of said inverter, after being decreased, is increased to exceed a second predetermined value during operation of said regeneration prohibiting means.

3. A control system for an electric vehicle according to claim 1, wherein said regeneration prohibiting means prohibits the regenerative operation of said motor by converting the target electric power calculated by said target electric power calculating means from a negative value into a positive value.

4. A control system for an electric vehicle according to claim 2, wherein said regeneration prohibiting means prohibits the regenerative operation of said motor by converting the target electric power calculated by said target electric power calculating means from a negative value into a positive value.

5. A control system for an electric vehicle, comprising:

an inverter which is disposed between a battery and a motor and which converts a DC electric power of said battery into an AC electric power to supply it to said motor during driving of said motor, and converts an AC electric power generated by said motor into a DC electric power to supply it to said battery during regenerative operation of said motor;

an electric current sensor for detecting an electric current in a DC section of said inverter;

a voltage sensor for detecting a voltage in the DC section of said inverter;

an actual electric power calculating means for calculating an actual electric power to be inputted to said inverter, based on an electric current detected by said electric current sensor and a voltage detected by said voltage sensor;

a target electric power calculating means for calculating a target electric power to be inputted to said inverter, based on at least an accelerator opening degree;

and a feed-back control means for controlling the operational state of said motor through said inverter to make the actual electric power calculated by said actual electric power calculating means coincide with the target electric power calculated by said target electric power calculating means; wherein said control system further includes a regeneration prohibiting means for prohibiting the regenerative operation of said motor for protecting said inverter, said regeneration prohibiting means being operated when the voltage in the DC section of said inverter exceeds a predetermined value, and the operation of said regeneration prohibiting means being stopped when at least one of (a) the electric current in the DC section of said inverter exceeds a predetermined value during operation of said regeneration prohibiting means and (b) the voltage in the DC section of said inverter, after being decreased, is increased to exceed a second predetermined value during operation of said regeneration prohibiting means.

* * * * *